United States Patent [19]

Moriguchi et al.

[11] Patent Number: 5,169,583
[45] Date of Patent: Dec. 8, 1992

[54] METHOD OF PRODUCING RESIN SHEET WITH ROUGHENED SURFACE

[75] Inventors: Kazutomo Moriguchi, Soka; Mituo Kajiwara, Matsudo; Ikuo Sekiguchi, Kuki, all of Japan

[73] Assignee: Somar Corporation, Japan

[21] Appl. No.: 697,662

[22] Filed: May 9, 1991

[30] Foreign Application Priority Data

May 11, 1990 [JP] Japan ................... 2-122288

[51] Int. Cl.$^5$ ................ B29C 47/00; B29C 59/04; B29C 71/02
[52] U.S. Cl. ............... 264/177.19; 264/210.2; 264/210.5; 264/237; 264/327; 264/348; 264/280; 425/327; 425/385; 425/404; 425/445
[58] Field of Search ............... 264/210.2, 280, 175, 264/167, 210.5, 177.1, 177.17, 177.19, 237, 348, 327; 425/325, 363, 141, 404, 327, 385, 445

[56] References Cited

U.S. PATENT DOCUMENTS

| | | | |
|---|---|---|---|
| 2,631,954 | 3/1953 | Bright | 264/175 |
| 3,328,503 | 6/1967 | Ancker | 264/175 |
| 3,732,349 | 5/1973 | Chen et al. | 264/175 |
| 4,722,820 | 2/1988 | Flecknoe-Brown | 264/210.2 |
| 4,859,392 | 8/1989 | Vetter | 264/175 |
| 4,874,571 | 10/1989 | Muller | 264/175 |

FOREIGN PATENT DOCUMENTS

| | | | |
|---|---|---|---|
| 53-86759 | 7/1978 | Japan | 264/210.2 |
| 1179234 | 1/1970 | United Kingdom | 425/325 |

*Primary Examiner*—Jeffery Thurlow
*Assistant Examiner*—Mathieu Vargot
*Attorney, Agent, or Firm*—Lorusso & Loud

[57] ABSTRACT

A crystalline resin sheet having one, smooth surface and the other, roughened surface is produced by extruding a melt of the resin through a die to form a molten sheet, the molten sheet being subsequently contacted, at only one of the both surfaces thereof, with a cooled, smooth surface maintained at a temperature lower by 20°–90° C. than the melting point of the resin to solidify the molten sheet and to make the contacted surface of the sheet smooth. The other surface of the sheet which has not been contacted with a cooled surface becomes roughened because of the crystallization of the resin.

6 Claims, 1 Drawing Sheet

METHOD OF PRODUCING RESIN SHEET WITH ROUGHENED SURFACE

BACKGROUND OF THE INVENTION

This invention relates to a method of producing a resin sheet having a roughened side and a smooth, opposite side.

Resin sheets with a roughened surface are utilized in many applications as, for example, washers, sliders, spacers, torque adjustable sheets which are subjected to sliding contact with other parts. Since the surface roughness imparts translucency light-scattering property, such sheets are also used as front covers of lights and indicators. For the roughening of a surface of a resin sheet, a sand blast method or a crimping method is generally adopted. However, the sand blast method is undesirable because of fluffing of the treated surface. The fluffs cause an increase in friction and form dust during use. The crimping method, on the other hand, cannot form specifically finely roughened surfaces with, for example, a center line average height of several micron meters or less.

SUMMARY OF THE INVENTION

It is, therefore, an object of the present invention to provide a simple method which can produce a resin sheet whose one side is roughed to have a center line average height of about 3 μm or less.

Another object of the present invention is to provide a method of the above-mentioned type which can produce a resin sheet whose roughened surface does not fluff.

It is a further object of the present invention to provide a resin sheet whose one side is smooth and whose the other is finely roughened to have a center line average height of about 3 μm or less.

In accomplishing the foregoing objects, there is provided in accordance with the present invention a method of producing a sheet of a crystalline resin, comprising the steps of:

extruding a melt of the resin through a die to form a molten sheet; and contacting only one of the both surfaces of said molten sheet with a cooled, smooth surface maintained at a temperature lower by 20°-90° C. than the melting point of said resin to solidify said molten sheet and to make the contacted surface of said sheet smooth.

It has been found that when one side of a molten, resin sheet extruded through a slit of a die is contacted with a cooled roll while allowing the other side thereof to solidify without touching with a roll surface, there is obtained a sheet having a smooth surface on the side that has been contacted with the cooled roll and a finely roughened surface on the opposite side. The roughened surface has a center line average height of in the range of 0.2-3 μm. The microscopic analysis reveals that the surface roughness is attributed to a multiplicity of round protrusions formed of crystalline particles.

The present invention also provides a resin sheet obtained by the above method and having a smooth surface on one side thereof and a roughened surface on the other side thereof, the roughened surface having a center line average height of in the range of 0.2-3 μm.

"Center line average height", which is also termed "arithmetical mean deviation Ra", used in the present specification is as measured in accordance with Japanese Industrial Standard JIS B0601.

BRIEF DESCRIPTION OF THE DRAWINGS

Other objects, features and advantages of the present invention will become apparent from the detailed description of the preferred embodiments of the invention which follows, when considered in light of the accompanying drawings, in which.

DETAILED DESCRIPTION OF THE PREFERRED EMBODIMENTS OF THE INVENTION

Figure 1:
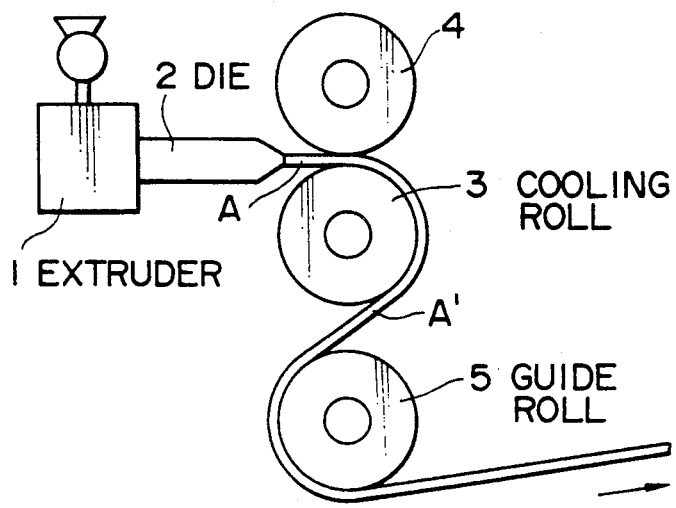
FIG. 1 is a diagrammatical illustration of an apparatus suitable for carrying out the method of the present invention.

Referring to FIG. 1, the reference numeral 1 denotes an extruder having a T-die 2 for extruding a melt of a crystalline resin therethrough. The resin may be, for example, a polyamide resin, a polyolefin resin, a polyacetal resin, a polyester resin and a polyether ether ketone resin. The use of a high density polyethylene resin or a polyacetal resin can provide especially good surface roughness with a low friction coefficient and is preferred. The extrusion temperature is generally higher by 30°-50° C. than the melting point of the resin.

The extruded, molten sheet A is then contacted with a cooled surface, preferably a cooling roll 3, to cool the molten sheet A and to obtain a solidified sheet A'. In this case, it is essential that only one side of the molten sheet A should be contacted with the cooling roll 3. By this, this side of the solidified sheet A' is rendered smooth while the other side thereof forms a finely roughened surface. The cooled surface to be contacted with one side of the molten sheet A is preferably formed into a mirror finished surface to obtain smooth surface of less than 0.01 μm in terms of center line average height.

It is also important that the cooling roll 3 has a surface temperature lower by 20-90° C., preferably 30°-70° C., than the melting point of the resin. If the difference between the surface temperature and the melting point is smaller than 20° C., the surface roughness of the resulting sheet on the side which has not been contacted with the cooling roll 3 becomes insufficient. On the other hand, if the difference between the surface temperature and the melting point is greater than 90° C., wrinkles are apt to be formed in the resulting sheet due to abrupt shrinkage. By controlling the surface temperature within the above range, the suitable surface roughness of 0.2-3 μm, especially 0.3-2 μm, in terms of center line average height, may be obtained.

The cooling of the molten sheet A is preferably effected by passing the molten sheet A through a nip defined between a pair of parallel, first and second rotating rolls 3 and 4. In this case, one or both sides only of the molten sheet A are nipped between the rolls 3 and 4. One side of the intermediate portion of the sheet A is contacted with the first roll (cooling roll) 3, while the other side is not contacted with the second roll 4.

Figure 2:
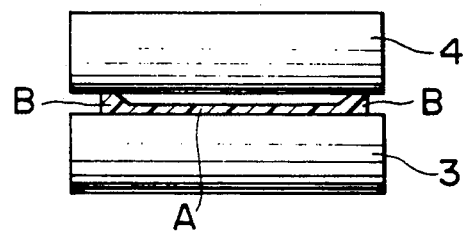
FIG. 2 is a partial front view showing one embodiment of a pair of rolls of the apparatus of FIG. 1.

This can be suitably attained by, as shown in FIG. 2, using molten sheet A which is relatively thick in at least one of the both side edges thereof (both sides edges are made thick in the specific shown) and is relatively thin in the other portion thereof. Such a molten sheet A having thick portions B may be obtained by using a die 2 having a suitable slit structure. By passing the molten sheet A between the first and second rolls 3 and 4 arranged to define a gap which is smaller than the relatively thick portions B but is greater than said relatively thin portion, the relatively thick portions B of the molten sheet A are nipped by the first and second rolls 3 and 4 while only one side of the relatively thin portion is contacted with the first, cooling roll with the other side of the relatively thin portion being prevented from touching with the second roll 4.

Figure 3:
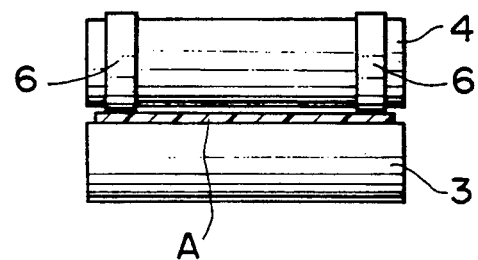
FIG. 3 is a partial front view, similar to FIG. 2, showing another embodiment of a roll arrangement.

Alternatively, similar results may be obtained by using a roll arrangement as shown in FIG. 3. In this embodiment, the first and second rolls 3 and 4 are arranged so as to form therebetween a first, relatively small gap adjacent to at least one side portion thereof and a second, relatively large gap in an intermediate portion thereof. The first gap is smaller than the thickness of the molten sheet A while the second gap is greater than the thickness of the molten sheet A. By passing the molten sheet A between the first and second rolls 3 and 4, the molten sheet is nipped in the first gap by the first and second rolls 3 and 4 and only one side of the molten sheet A is contacted with the first, cooling roll with the other side thereof located in the second gap being prevented from touching with the second roll 4. The different gaps may be easily defined by forming a large diameter portion or portions 6 in one or both side portions of the second roll 4.

The thus cooled sheet A' is then passed to a take-up device (not shown) through a guide roll 5 and a severing device (not shown). Thus, the resin sheet may be prepared in a fully continuous method. The running speed (linear speed) of the sheet is generally in the range of 10-200 m/hour. The resin sheet thus prepared has generally a thickness of at least 50 $\mu$m, preferably 100-500 $\mu$m. The surface roughness may be controlled by control of the cooling speed, generally the cooling temperature. Rapid cooling gives a roughened surface with a larger center line average height, while gentle cooling gives a roughened surface with a smaller center line average height. A resin sheet according to the present invention having a surface with a center line average height of 1-3 $\mu$m exhibits good pencil take property and ink receiving property. A resin sheet with a center line average height of 0.3-1.5 $\eta$m exhibits a low frictional coefficient. The smooth surface of the resin sheet on the opposite side of the roughened surface provides close contact with a solid surface to which the resin sheet is to be bonded. Thus, the resin sheet according to the present invention can be utilized in a wide variety of applications.

The following examples will further illustrate the present invention.

EXAMPLE 1

Polyacetal resin (polyacetal homopolymer, melting point 175° C., DELRIN II manufactured by du Pont Inc.) was charged in a single-screw extruder with a screw diameter of 50 mm equipped with a T-die having a width of 380 mm and extruded through the T-die. The extruded sheet was contacted with a cooled roll maintained at a temperature shown in Table 1 to obtain a resin sheet having a thickness of 200 $\mu$m and a roughened surface and a smooth, opposite surface. The center line average height and the coefficient of friction of the roughened and smooth surfaces were measured to obtain the results shown in Table 1. The center line average height was measured in accordance with JIS B0601. The friction coefficient was measured as follows:

Sample sheet (50×50×0.2 mm) and a steel ring (S-45C ring) are subjected to a frictional abrasion test using Model EFM-III-E test machine (manufactured by Orientic Inc.) under a load of 0.75 kg/cm$^2$ and a moving speed of 0.5 m/sec. The coefficient of friction after 60 minutes from the commencement of the test is measured.

No dust was found to be formed from the roughened surface of the sample sheet during the above frictional abrasion test.

TABLE 1

| | Experiment No. | | | | |
| --- | --- | --- | --- | --- | --- |
| | 1** | 2 | 3 | 4 | 5* |
| Surface Temperature of Roll (°C.) | 80 | 100 | 120 | 140 | 160 |
| Center Line Average Height ($\mu$m) | | | | | |
| Smooth Surface | — | <0.01 | <0.01 | <0.01 | — |
| Roughened Surface | — | 0.28 | 0.35 | 0.49 | — |
| Coefficient of Friction | | | | | |
| Smooth Surface | — | 0.278-0.390 | 0.278-0.390 | 0.278-0.390 | — |
| Roughened Surface | — | 0.212-0.260 | 0.226-0.30 | 0.232-0.350 | — |

**Wrinkles were formed on the surface of the sheet.
*Molten resin sticks onto the surface of the roll.

EXAMPLE 2

Example 1 was repeated in the same manner as described except that a high density polyethylene resin (melting point: 130° C.) was substituted for the polyacetal resin. The test results are summarized in Table 2. No dust was found to be formed from the roughened surface of the sample sheet during the above frictional abrasion test.

TABLE 2

| | Experiment No. | | | | |
| --- | --- | --- | --- | --- | --- |
| | 6** | 7 | 8 | 9 | 10* |
| Surface Temperature of Roll (°C.) | 40 | 60 | 80 | 100 | 120 |
| Center Line Average Height ($\mu$m) | | | | | |
| Smooth Surface | — | <0.01 | 0.23 | 0.50 | — |
| Roughened Surface | — | 0.67 | 0.89 | 1.11 | — |
| Coefficient of Friction | | | | | |
| Smooth Surface | — | 0.215-0.232 | 0.190-0.220 | 0.189-0.211 | — |
| Roughened Surface | — | 0.117-0.175 | 0.132-0.180 | 0.158-0.186 | — |

**Wrinkles were formed on the surface of the sheet.

COMPARATIVE EXAMPLE 1

A polyacetal resin sheet (thickness: 0.5 mm) having smooth surfaces was subjected to a sand blast treatment to obtain a roughened surface with a center line average height of 2.02 $\mu$m. This sheet was measured for its frictional coefficient in the same manner as that in Example 1. The coefficient ranges from 0.260-0.528 indicating that the surface roughness is not uniform. After 10 minutes from the commencement of the abrasion test, dust was found to form.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A method of producing a sheet of a crystalline resin, comprising the steps of:
   extruding a melt of the resin through a die to form a molten sheet having opposite first and second surfaces, said die being so shaped that said extruded, molten sheet is relatively thick at the side edges thereof and is relatively thin in a major, intermediate portion thereof;
   providing a pair of parallel, first and second rolls forming therebetween a gap which is smaller than the relatively thick portion of said molten sheet but is greater than said relatively thin intermediate portion of said molten sheet, said first roll providing a cooled, smooth surface; and
   passing said molten sheet through said gap so that the relatively thick portion of said molten sheet is nipped by said first and second rolls while contacting only said first surface of said molten sheet with said first roll, said smooth surface of said first roll being maintained at a temperature lower by 20°-90° C. than the melting point of said resin to solidify said molten sheet and to smooth said first surface of said sheet, while avoiding contact of said intermediate portion of said second surface by said second roll during said contacting of said first surface with said cooled, smooth surface, to allow said second surface to become roughened by crystallization of the resin.

2. A method as claimed in claim 1, wherein said resin is a high density polyethylene resin or a polyacetal resin.

3. A method as claimed in claim 1, wherein said contacting step is performed so that the surface of said sheet opposite to said smooth surface has a center line average height of in the range of 0.2-3 μm.

4. A method of producing a sheet of a crystalline resin, comprising the steps of:
   extruding a melt of the resin through a die to form a molten sheet having opposite first and second surfaces;
   providing a pair of parallel, first and second rolls forming therebetween a first gap adjacent to at least one side portion thereof and a second gap in an intermediate portion thereof, said first gap being smaller than the thickness of said molten sheet with said second gap being greater than the thickness of said molten sheet, said first roll providing a cooled, smooth surface maintained at a temperature lower by 20°-90° C. than the melting point of said resin; and
   passing said molten sheet between said first and second rolls so that said molten sheet is nipped in said first gap between said first and second rolls and contacting only one side of said molten sheet with said first roll to solidify said molten sheet and to smooth said first surface of said sheet, with the other side of said molten sheet located in said second gap being prevented from touching with said second roll, to allow said second surface to become roughened by crystallization of the resin.

5. A method as claimed in claim 4, wherein said resin is a high density polyethylene resin or a polyacetal resin.

6. A method as claimed in claim 4, wherein said contacting step is performed so that the surface of said sheet opposite to said smooth surface has a center line average height of in the range of 0.2-3 μm.

* * * * *

UNITED STATES PATENT AND TRADEMARK OFFICE
CERTIFICATE OF CORRECTION

PATENT NO. : 5,169,583

DATED : December 8, 1992

INVENTOR(S) : MORIGUCHI et al.

It is certified that error appears in the above-identified patent and that said Letters Patent is hereby corrected as shown below:

Col. 3, line 47, delete "$\eta$m" and insert --$\mu$m--.

Signed and Sealed this

Twenty-third Day of November, 1993

Attest:

BRUCE LEHMAN

*Attesting Officer*     *Commissioner of Patents and Trademarks*